United States Patent
Briskin et al.

(10) Patent No.: US 9,122,912 B1
(45) Date of Patent: Sep. 1, 2015

(54) SHARING PHOTOS IN A SOCIAL NETWORK SYSTEM

(71) Applicant: Google Inc., Mountain View, CA (US)

(72) Inventors: Gil Simha Briskin, Petach Tikva (IL); Asaf Zomet, Jerusalem (IL)

(73) Assignee: Google Inc., Mountain View, CA (US)

( * ) Notice: Subject to any disclaimer, the term of this patent is extended or adjusted under 35 U.S.C. 154(b) by 186 days.

(21) Appl. No.: 13/802,270

(22) Filed: Mar. 13, 2013

Related U.S. Application Data

(60) Provisional application No. 61/611,017, filed on Mar. 15, 2012.

(51) Int. Cl.
*G06K 9/00* (2006.01)

(52) U.S. Cl.
CPC .................................. *G06K 9/00288* (2013.01)

(58) Field of Classification Search
None
See application file for complete search history.

(56) References Cited

U.S. PATENT DOCUMENTS

| | | | |
|---|---|---|---|
| 7,555,148 B1 | 6/2009 | Steinberg et al. | |
| 7,809,192 B2 | 10/2010 | Gokturk et al. | |
| 8,031,914 B2 * | 10/2011 | Zhang | 382/118 |
| 8,861,804 B1 * | 10/2014 | Johnson et al. | 382/118 |
| 2009/0161962 A1 | 6/2009 | Gallagher et al. | |
| 2010/0254577 A1 | 10/2010 | Vanhoucke et al. | |
| 2011/0035406 A1 * | 2/2011 | Petrou et al. | 707/769 |
| 2011/0085710 A1 | 4/2011 | Perlmutter et al. | |
| 2011/0211736 A1 * | 9/2011 | Krupka et al. | 382/118 |
| 2012/0014560 A1 * | 1/2012 | Obrador et al. | 382/103 |
| 2013/0124539 A1 * | 5/2013 | Lin et al. | 707/749 |
| 2013/0243268 A1 * | 9/2013 | Bedros et al. | 382/118 |

* cited by examiner

*Primary Examiner* — Daniel Mariam
(74) *Attorney, Agent, or Firm* — IP Spring

(57) ABSTRACT

Embodiments generally relate to sharing photos in a social network system. In one embodiment, a method includes obtaining a plurality of photos associated with a target user in a social network system, and detecting a face of one or more persons in the plurality of photos. The method also includes computing significance values for the faces, where each significance value indicates a degree of significance between the target user and each person represented by each face. The method also includes generating a significance ranking of the significance values, and determining a group of photos for the target user based on the significance ranking.

16 Claims, 8 Drawing Sheets

SHARING PHOTOS IN A SOCIAL NETWORK SYSTEM

CROSS-REFERENCE TO RELATED APPLICATIONS

This application claims the benefit of U.S. Provisional Application No. 61/611,017, filed Mar. 15, 2012, and which is incorporated herein by reference in its entirety.

BACKGROUND

Social network systems often enable users to share photos with each other. For example, users can share photos with friends and family, which provides enjoyable and bonding experiences among users of social network systems. A user can create a photo album that is associated with the user's profile. As owner of the photo album, the user can then allow other users to view the photo album when visiting the photos section of the user's profile.

SUMMARY

Implementations generally relate to sharing photos in a social network system. In some implementations, a method includes obtaining a plurality of photos associated with a target user in a social network system, and detecting faces of one or more persons in the plurality of photos. The method also includes computing significance values for the faces, where each significance value indicates a degree of significance between the target user and each person represented by each face. The method also includes generating a significance ranking of the significance values, and determining a group of photos for the target user based on the significance ranking.

With further regard to the method, in some implementations, the significance value for each face is based on one or more of a frequency that each face appears in the plurality of photos and a type of social connection between that target user and each person associated with each face. In some implementations, the determining of the group of photos includes applying a clustering algorithm to consolidate multiple appearances of a same face in the plurality of photos. In some implementations, the determining of the group of photos includes: determining a quality value for each photo that includes a same face having multiple appearances in the plurality of photos; generating a quality ranking of the quality values; and selecting a representative photo to represent the same face in the group of photos based on the quality ranking. In some implementations, the method also includes transmitting the group of photos to the target user. In some implementations, the method also includes transmitting the group of photos to the target user; and prompting the target user with a sharing option to share one or more of the photos with people whose faces are shown in the photos. In some implementations, the method also includes transmitting the group of photos to the target user; and prompting the target user with a tagging option to tag one or more of the photos. In some implementations, the determining of the group of photos is based at least in part on one or more predetermined quality criteria.

In some implementations, a method includes obtaining a plurality of photos associated with a target user in a social network system, where the photos are photos that the target user has stored in the social network system. The method also includes detecting a face of one or more persons in the plurality of photos, where the detecting of each face includes applying a face detection algorithm. The method also includes computing significance values for the faces, where each significance value indicates a degree of significance between the target user and each person represented by each face. The method also includes generating a significance ranking of the significance values. The method also includes determining a group of photos for the target user based on the significance ranking. The method also includes transmitting the group of photos to the target user. The method also includes enabling the target user to take one or more predetermined actions associated with one or more photos of the group of photos.

With further regard to the method, in some implementations, the significance values are based on one or more of a frequency that each face appears in the photos and a type of social connection between that target user and each person associated with each face. In some implementations, the determining of the group of photos includes applying a clustering algorithm to consolidate multiple appearances of a same face in the plurality of photos, and where the applying of the clustering algorithm includes: determining a quality value for each photo that includes the same face; generating a quality ranking of the quality values; and selecting a representative photo to represent the same face in the group of photos based on the quality ranking. In some implementations, the one or more predetermined actions include sharing one or more of the photos with people whose faces are shown in the photos. In some implementations, the one or more predetermined actions include tagging one or more of the photos.

In some implementations, a system includes one or more processors, and logic encoded in one or more tangible media for execution by the one or more processors. When executed, the logic is operable to perform operations including obtaining a plurality of photos associated with a target user in a social network system, and detecting faces of one or more persons in the plurality of photos. The logic when executed is further operable to perform operations including computing significance values for the faces, where each significance value indicates a degree of significance between the target user and each person represented by each face. The logic when executed is further operable to perform operations including generating a significance ranking of the significance values, and determining a group of photos for the target user based on the significance ranking.

With further regard to the system, in some implementations, the significance value for each face is based on one or more of a frequency that each face appears in the plurality of photos and a type of social connection between that target user and each person associated with each face. In some implementations, to determine the group of photos, the logic when executed is further operable to perform operations including applying a clustering algorithm to consolidate multiple appearances of a same face in the plurality of photos. In some implementations, to determine the group of photos the logic when executed is further operable to perform operations including: determining a quality value for each photo that includes a same face having multiple appearances in the plurality of photos; generating a quality ranking of the quality values; and selecting a representative photo to represent the same face in the group of photos based on the quality ranking. In some implementations, the logic when executed is further operable to perform operations including transmitting the group of photos to the target user. In some implementations, the logic when executed is further operable to perform operations including transmitting the group of photos to the target user; and prompting the target user with a sharing option to share one or more of the photos with people whose faces are shown in the photos. In some implementations, the logic when executed is further operable to perform operations including transmitting the group of photos to the target user; and prompting the target user with a tagging option to tag one or more of the photos.

DETAILED DESCRIPTION

Implementations for sharing photos in a social network system are described. In various implementations, the group of photos is generated based on the significance of the people in the photos to the target user. In some implementations, a system obtains photos associated with a target user in a social network. The system detects the faces of people in the photos and then computes significance values for the faces, where each significance value indicates a degree of significance between the target user and each person represented by each face. In some implementations, the significance value for each face may be based on the frequency that each face appears in the photos. For example, if a given person appears in the photos with high frequency, that person would receive a higher significance value. A higher significance value may indicate a higher degree of significance (e.g., a family member, close friend, etc.) between the person in the photos and the target user.

The system then generates a significance ranking of the significance values, and then determines a group of photos for the target user based on the significance ranking. For example, the system may include people with higher significance rankings (e.g., family members, close friends, etc.) in the group of photos. The system then transmits the group of photos to the target user. In various implementations, the system prompts the target user with a sharing option to share one or more of the photos with people whose faces are shown in the photos.

Figure 1:
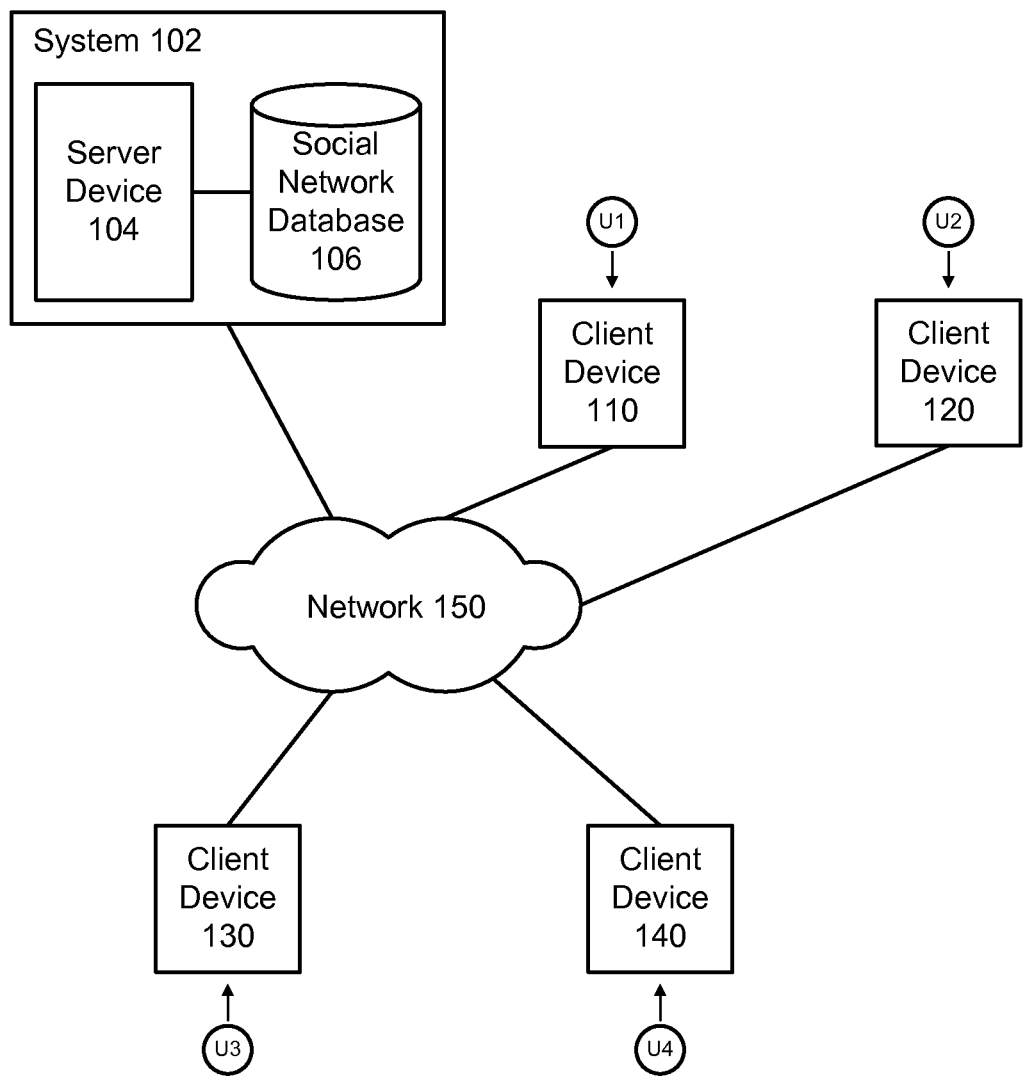
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140.

Figure 2:
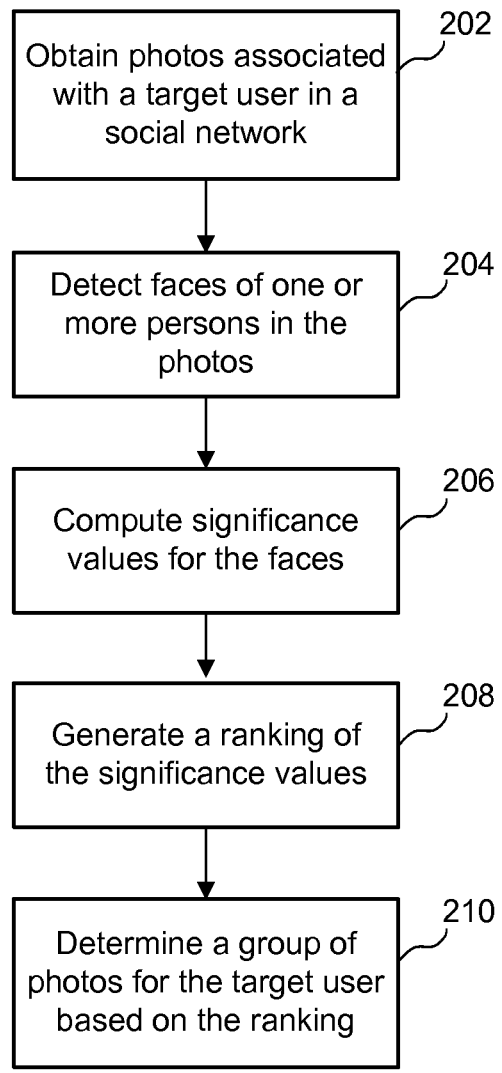
FIG. 2 illustrates an example simplified flow diagram for sharing photos in a social network, according to some implementations.

FIG. 2 illustrates an example simplified flow diagram for sharing photos in a social network, according to some implementations. Referring to both FIGS. 1 and 2, a method is initiated in block 202, where system 102 obtains photos associated with a target user in a social network system. In some implementations, the photos are photos that the target user has stored in the social network system. For example, the target user may have taken the photos using a camera, and then uploaded the photos to the social network system. The target user may also have received the photos from other users via the social network system.

In block 204, system 102 detects the face of one or more persons in the photos. In some implementations, system 102 may use a detection algorithm to detect faces of people in the photos, and may also use a facial recognition algorithm to recognize people associated with faces in the photos.

As described in more detail below, system 102 enables users of the social network system to specify and/or consent to the use of personal information, which may include system 102 using their faces in photos or using their identity information in recognizing people identified in photos.

In block 206, system 102 computes significance values for the faces. In some implementations, each significance value indicates a degree of significance between the target user and each person represented by each face. In other words, the significance value indicates how important a person in a photo is to a target user. In some implementations, the significance value for each face may be based on the frequency that each face appears in the photos.

In some implementations, a particular face gets a significance value that is proportional to the frequency that the face appears in photos in the target user's photo albums. For example, if a given person appears in the photos with high frequency, system 102 may compute a higher significance value for that person. In various implementations, the higher significance value indicates a higher degree of significance between the person in the photos and the target user. The person may be captured in many photos because the person is a family member, or close friend, etc. In another example, a significance value may also be based on a type of social connection between that target user and each person associated with each face. Types of social connections that may warrant higher significance values may include family members and close friends. For example, a child's face that appears in his or her mom's photo album would get a higher significance value. The face of an acquaintance that appears would get a lower significance value. In various implementations, system 102 may compute the significance values for faces based on the frequency that each face appears in the photos, the type of social connection between that target user and each person associated with each face, or a combination thereof.

In block 208, system 102 generates a significance ranking of the significance values. System 102 may use any suitable ranking algorithm to generate the significance ranking.

In block 210, system 102 determines a group of photos for the target user based at least in part on the significance ranking. For example, system 102 may determine a group of photos that include photos containing faces having significance rankings that meet a predetermined threshold (e.g., the top 5 ranking faces, the top 10 ranking faces, the top 15 ranking faces, etc.).

In some implementations, in determining a group of photos, system 102 may apply a selection function in order to select photos for the given group of photos. In various implementations, a selection function may be defined by ranking functions in that system 102 selects photos for a given group of photos with faces having the top ranked significance values. In some implementations, system 102 may apply the selection function when there are more appearances in the visual media than can be displayed in the user interface.

In various implementations, where there are multiple photos that contain a given face, system 102 may select one of the photos to represent the given face in the group of photos based on a ranking function. In some implementations, system 102 may rank the photos of the same face based on a quality value of each photo of the same face. For example, a photo that is in focus would rank higher than one that is blurry. System 102 may select the photo with the highest quality ranking to represent a given face in the group of photos. System 102 then selects a photo to represent the same face in the group of photos based on the ranking.

Figure 3:
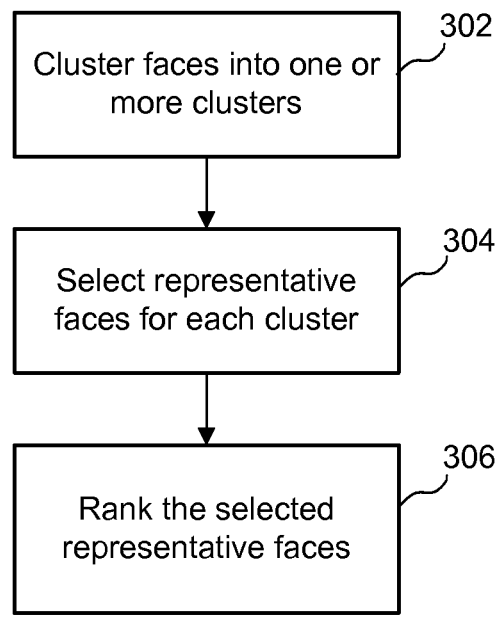
FIG. 3 illustrates an example simplified flow diagram for determining a group of photos, according to some implementations.

FIG. 3 illustrates an example simplified flow diagram for determining a group of photos, according to some implementations. In some implementations, system 102 may perform the follow steps in a ranking function R for a set of detected faces in photos. In some implementations, a method is initiated in block 302, where system 102 clusters faces into one or more clusters (e.g., clusters C1 to Cn). In block 304, system 102 selects representative faces (e.g., faces F1 to Fn) for each cluster. Example implementations for applying a clustering algorithm to consolidate multiple appearances of a same face in the photos are described in detail below in connection with FIG. 4.

In some implementations, system 102 may select the representative faces based on a quality criteria Q. In some implementations, system 102 may determine the quality criteria Q based on a face detection confidence score, where the face detection confidence score indicates a likelihood (or probability) that a given face in a photo matches a given reference image (e.g., a reference image corresponding to a known person in the social network system). In some implementations, the quality criteria Q may be based on a combined score of one or more of size, visibility/occlusion, contrast/sharpness (e.g., sum of absolute gradients), facial orientation estimates (e.g., cosine of facial orientation estimates), and facial smile/joy estimate and face detector confidence measure. In some implementations, quality criteria Q may be a sum of these scores, where each score is normalized (e.g., mean, variance, etc.). In block 306, system 102 ranks the selected representative faces. In some implementations, system 102 ranks the selected representative faces based on their frequency in the media as a first ordering, and ranks the selected representative faces based on their quality criteria Q as a secondary ordering.

Figure 4:
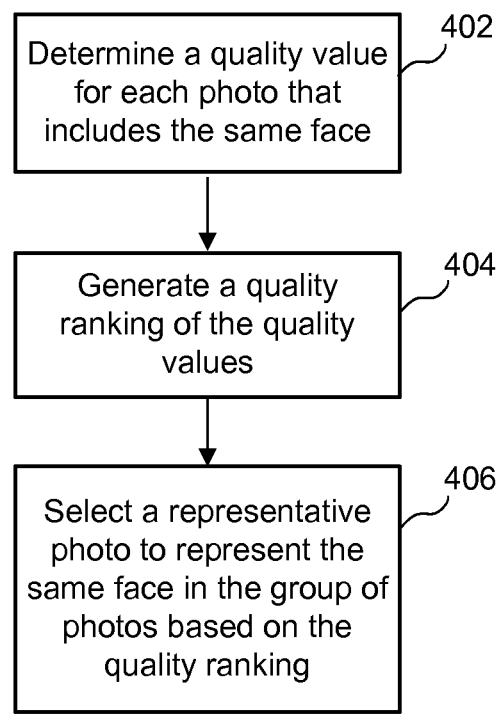
FIG. 4 illustrates an example simplified flow diagram for applying a clustering algorithm to consolidate multiple appearances of a same face in the photos, according to some implementations.

FIG. 4 illustrates an example simplified flow diagram for applying a clustering algorithm to consolidate multiple appearances of a same face in the photos, according to some implementations. In some implementations, a method is initiated in block 402, where system 102 determines a quality value for each photo that includes the same face. In block 404, system 102 generates a quality ranking of the quality values. In block 406, system 102 selects a representative photo to represent the same face in the group of photos based on the quality ranking.

In various implementations, system 102 transmits the group of photos to the target user. As described in more detail below in connection with FIGS. 5, 6, and 7, system 102 may present a group of photos to the target user and promote sharing in a variety of ways. In various implementations, system 102 enables the target user to take one or more predetermined actions associated with one or more photos of the group of photos. For example, system 102 enables the target user to share photos and other visual media with people shown in the group of photos. In another example, system 102 enables the target user to tag photos included in the group of photos. Example implementations are is described in more detail below in connection with FIGS. 5, 6, and 7.

Figure 5:
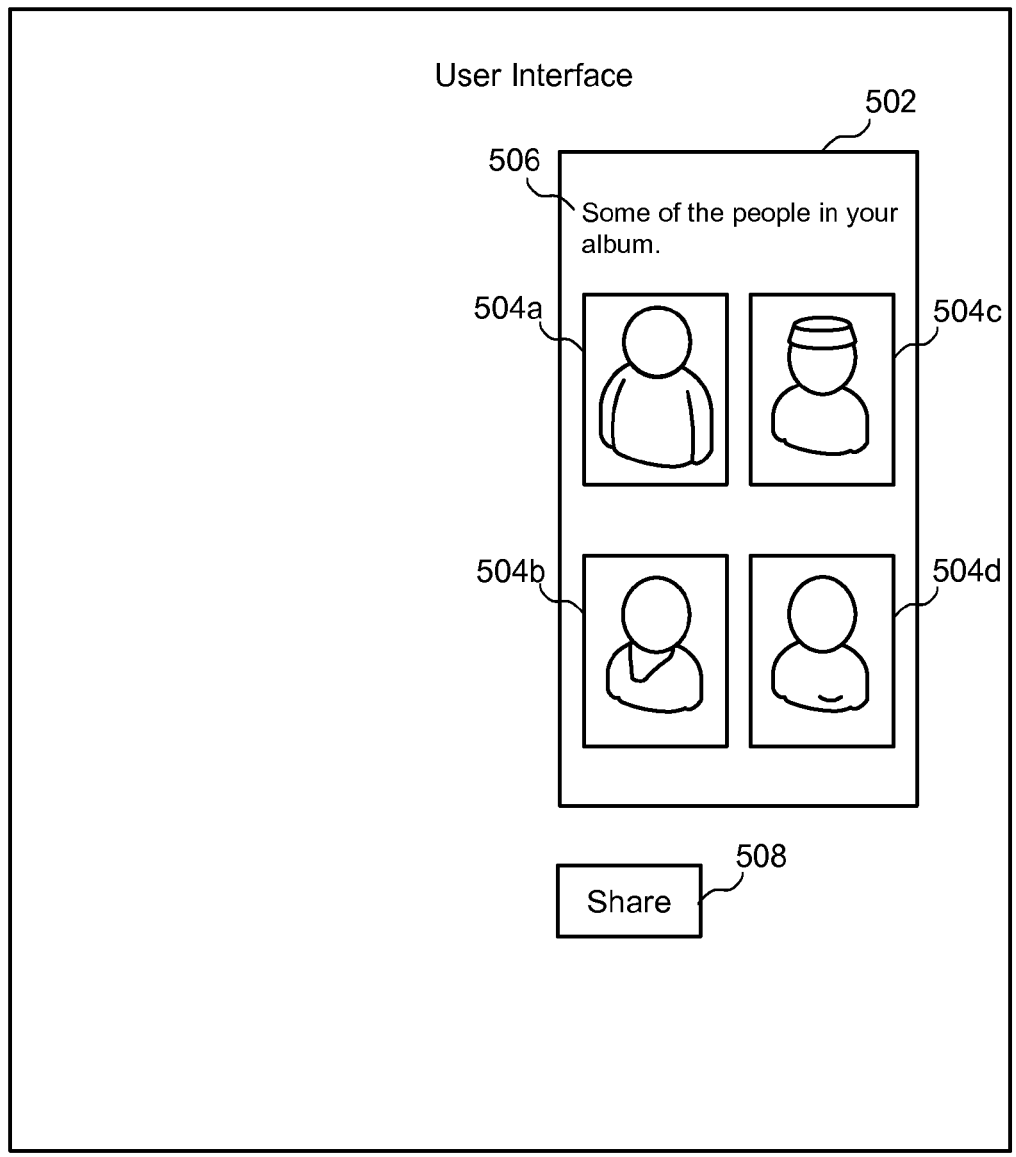
FIG. 5 illustrates an example simplified user interface, according to some implementations.

FIG. 5 illustrates an example simplified user interface 500, according to some implementations. In some implementations, system 102 causes a sharing window 502 to be displayed in user interface 500, and causes photos 504a, 504b, 504c, and 504d to be displayed in sharing window 502. For ease of illustration, four photos are shown. In various implementations, there may be any number of photos in sharing window 502.

In some implementations, system 102 may cause a message 506 to be displayed (e.g., "Some of the people in your album.") that highlight some significant people in the target user's photo album. In various implementations, the people shown are people selected by system 102 in accordance with implementations described herein, such as those described in connection with FIG. 2.

As shown, system 102 displays faces of people within sharing window 502 of user interface 500 without actually prompting the target user to share photos and other visual media with the people shown in the photos. Photos 504a, 504b, 504c, and 504d and message 506 implicitly promote sharing by serving as a reminder to the target user that the people in the photos are candidates for sharing photos or other visual media. As indicated above, system 102 enables the target user to take one or more predetermined actions associated with one or more photos of the group of photos. For example, one of the predetermined actions may include sharing photos. In some implementations, system 102 may provide the target user with a sharing option to share one or more photos with people whose faces are shown in the group of photos. For example, system 102 may cause a share button 508 to be displayed in user interface 500, which enables the target user to share photos (e.g., photos 504a, 504b, 504c, and 504d) and other visual media with people whose faces are shown in the photos.

In some implementations, system 102 prompts the target user, where the prompting may include prompting the target user with a sharing option to share one or more of the photos with people whose faces are shown in the group of photos. Example implementations for prompting the target user to share are described in more detail below in connection with FIG. 6.

Figure 6:
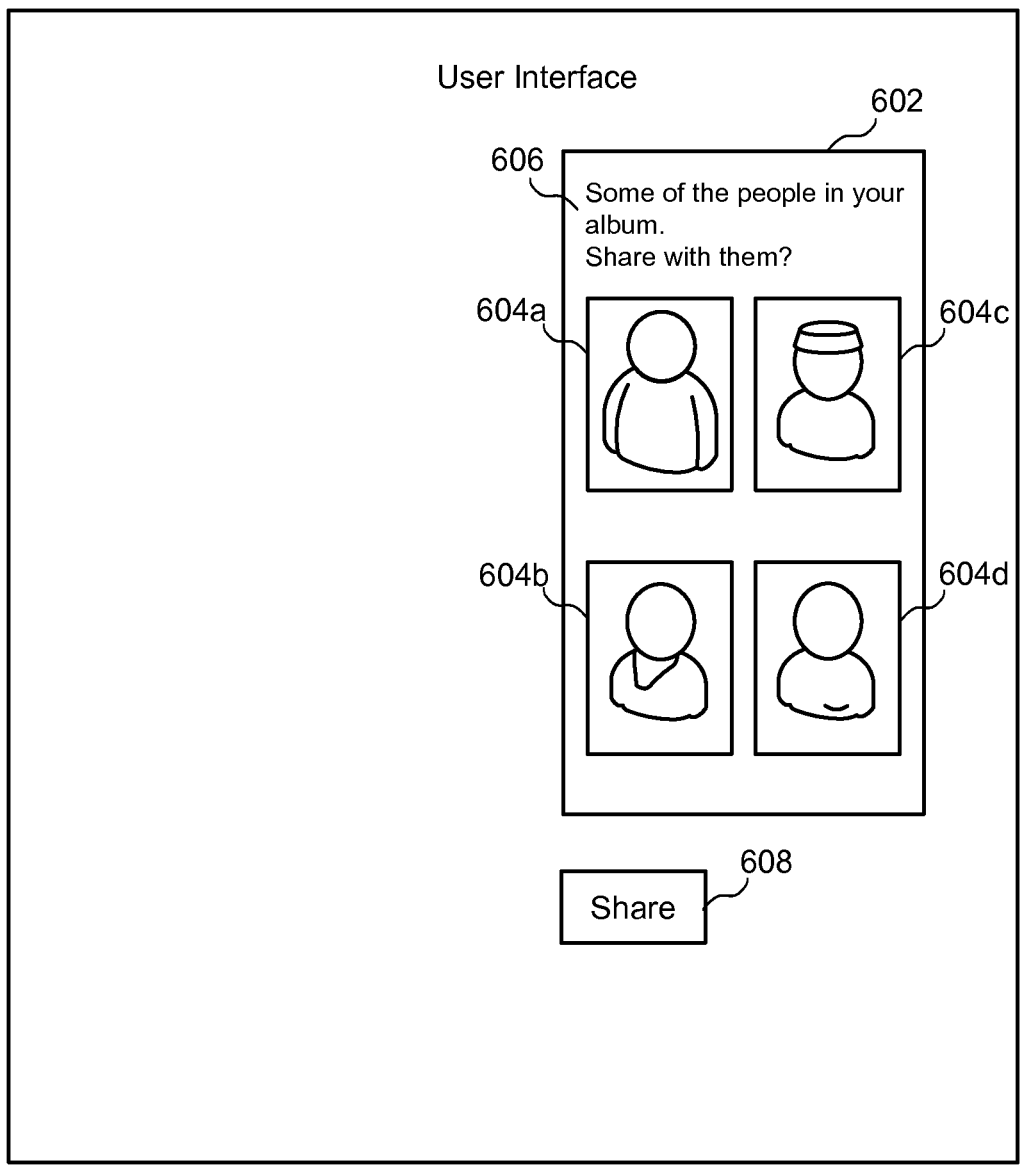
FIG. 6 illustrates an example simplified user interface, according to some implementations.

FIG. 6 illustrates an example simplified user interface 600, according to some implementations. In some implementations, system 102 causes a sharing window 602 to be displayed in user interface 600, and causes photos 604a, 604b, 604c, and 604d to be displayed in sharing window 602. For ease of illustration, four photos are shown. In various implementations, there may be any number of photos in sharing window 602.

In various implementations, system 102 may cause a message 606 to be displayed (e.g., "Some of the people in your album. Share with them?") that highlight some significant people in the target user's photo album. In various implementations, the people shown are people selected by system 102 in accordance with implementations described herein, such as those described in connection with FIG. 2.

In some implementations, system 102 causes message 606 to be displayed in user interface 600 in order to explicitly promote sharing. Message 606 suggests that the user share photos and other visual media with some of the people appearing in sharing window 602. In some implementations, system 102 may cause a share button 608 to be displayed in user interface 600, which enables the target user to share photos (e.g., photos 604a, 604b, 604c, and 604d) and other visual media with people whose faces are shown in the photos.

In some implementations, the prompting may also include prompting the target user with a tagging option to tag one or more of the photos in the group of photos. Example implementations for prompting the target user to share are described in more detail below in connection with FIG. 7.

Figure 7:
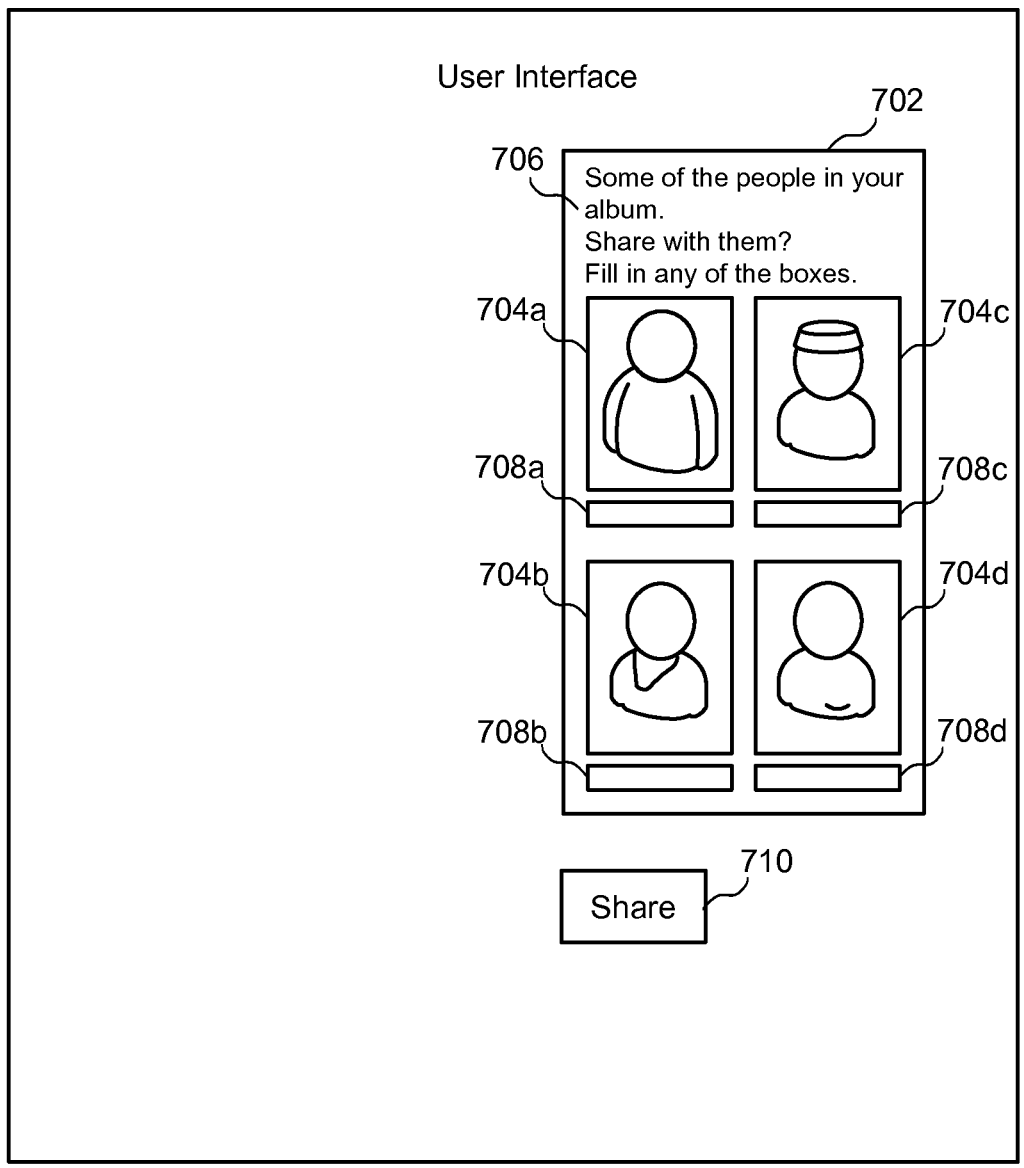
FIG. 7 illustrates an example simplified user interface, according to some implementations.

FIG. 7 illustrates an example simplified user interface 700, according to some implementations. In some implementations, system 102 causes a sharing window 702 to be displayed in user interface 700, and causes photos 704a, 704b, 704c, and 704d to be displayed in sharing window 702. For ease of illustration, four photos are shown. In various implementations, there may be any number of photos in sharing window 702.

In various implementations, system 102 may cause a message 706 to be displayed (e.g., "Some of the people in your album. Share with them? Fill in any of the boxes.") that highlight some significant people in the target user's photo album. In various implementations, the people shown are people selected by system 102 in accordance with implementations described herein, such as those described in connection with FIG. 2.

As indicated above, system 102 enables the target user to take one or more predetermined actions associated with one or more photos of the group of photos. In another example, one of the predetermined actions may include tagging photos. In some implementations, system 102 may provide the target user with a tagging option to tag one or more photos of people whose faces are shown in the group of photos (e.g., photos 704a, 704b, 704c, and 704d). For example, in some implementations, system 102 may cause tag fields 708a, 708b, 708c, and 708d to be displayed in user interface 700. In various implementations, tag fields 708a, 708b, 708c, and 708d may be positioned just below respective photos 704a, 704b, 704c, and 704d, or in any other suitable location next to the photo.

In some implementations, message 706 prompts the user to fill in tag fields 708a, 708b, 708c, and 708d identifying people in the photos. This promotes linkage between faces and identities. The target user filling in tag fields 708a, 708b, 708c, and 708d results in each photo being tagged. In some implementations, system 102 may cause a share button 710 to be displayed in user interface 700, which enables the target user to share photos (e.g., photos 704a, 704b, 704c, and 704d) and other visual media with people whose faces are shown in the photos.

In some implementations, system 102 may filter photos of people with whom the target user has already shared photos or other visual media. System 102 may also filter photos of people who have already appeared in a group of users for sharing.

Implementations described herein provide various benefits. For example, implementations increase overall engagement among users in a social networking environment. Implementations promote sharing and social interaction among family and friends via face detection. Implementations also promote visual media sharing by generating automatic sharing suggestions. Shared visual media may include, for example, photos, videos, and groups or albums of images and videos. Implementations promote sharing by displaying photos, and sharing may be achieved without having in advance a linkage between a face in a photo and a user identifier. In other words, implementations promote sharing by displaying a face of a person without necessarily knowing the identity of this person.

While system 102 is described as performing the steps as described in the implementations herein, any suitable component or combination of components of system 102 or any suitable processor or processors associated with system 102 may perform the steps described herein.

Figure 8:
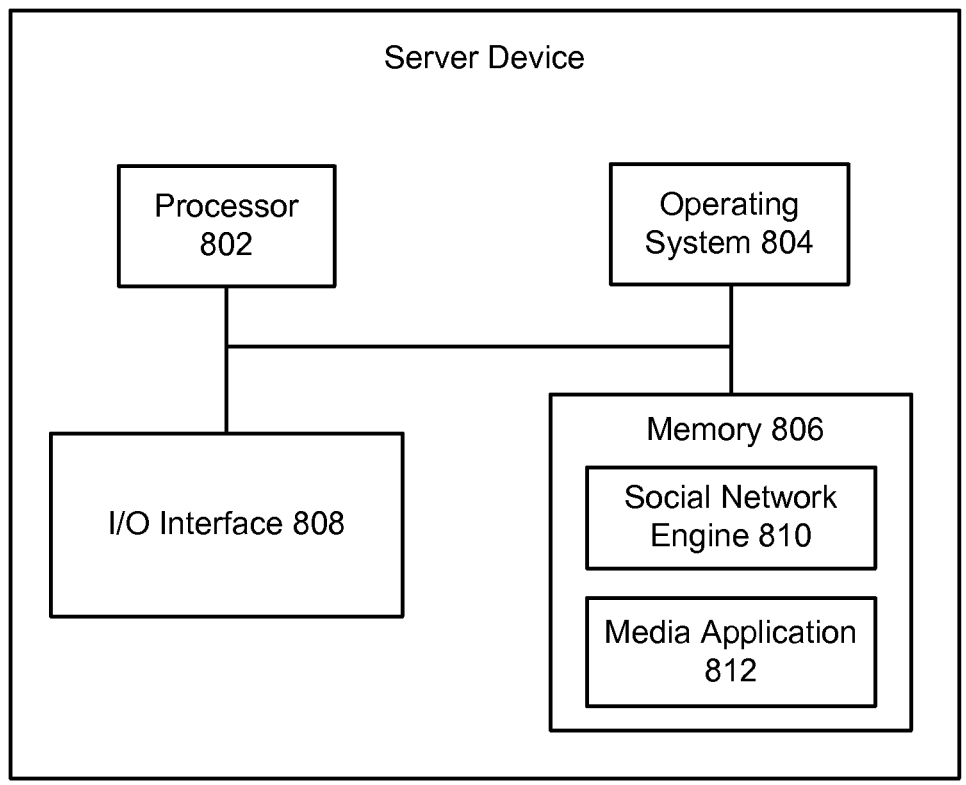
FIG. 8 is a block diagram of an example server device, which may be used to implement the implementations described herein.

FIG. 8 is a block diagram of an example server device 800, which may be used to implement the implementations described herein. For example, server device 800 may be used to implement server device 104 of FIG. 1, as well as to perform the method implementations described herein. In some implementations, server device 800 includes a processor 802, an operating system 804, a memory 806, and input/output (I/O) interface 808. Server device 800 also includes a social network engine 810 and a media application 812, which may be stored in memory 806 or on any other suitable storage location or computer-readable medium. Media application 812 provides instructions that enable processor 802 to perform the functions described herein and other functions.

For ease of illustration, FIG. 8 shows one block for each of processor 802, operating system 804, memory 806, social network engine 810, media application 812, and I/O interface 808. These blocks 802, 804, 806, 808, 810, and 812 may represent multiple processors, operating systems, memories, I/O interfaces, social network engines, and media applications. In other implementations, server device 800 may not have all of the components shown and/or may have other elements including other types of elements instead of, or in addition to, those shown herein.

In various implementations, system 102 may utilize a variety of recognition algorithms to recognize faces in media. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their photos for facial recognition in general. Example implementations for recognizing faces and other objects are described in more detail below.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in a photo, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the photo. In some implementations, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the photo to one more reference images with matching or similar features. In some implementations, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the photo matches a given reference image. In some implementations, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

Although the description has been described with respect to particular embodiments thereof, these particular embodiments are merely illustrative, and not restrictive. Concepts illustrated in the examples may be applied to other examples and embodiments. For example, although implementations disclosed herein are described in the context of photos, the embodiments may apply to other media such as videos.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time.

Note that the functional blocks, methods, devices, and systems described in the present disclosure may be integrated or divided into different combinations of systems, devices, and functional blocks as would be known to those skilled in the art.

Any suitable programming language and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:
1. A method comprising:
obtaining a plurality of photos associated with a target user in a social network system;
detecting a face of one or more persons in the plurality of photos, wherein the detecting of each face includes applying a face detection algorithm;

computing significance values for the faces, wherein each significance value indicates a degree of significance between the target user and each person represented by each face;
generating a significance ranking of the significance values;
determining a group of photos for the target user based on the significance ranking, wherein the determining of the group of photos includes applying a clustering algorithm to consolidate multiple appearances of a same face in the plurality of photos, and wherein the applying of the clustering algorithm includes:
  determining a quality value for each photo that includes the same face, wherein the quality value is based on a combined score of two or more of a face detection confidence score, size, visibility, sharpness, and a facial orientation estimate;
  generating a quality ranking of the quality values; and
  selecting a representative photo to represent the same face in the group of photos based on the quality ranking;
transmitting the group of photos to the target user; and
enabling the target user to take one or more predetermined actions associated with one or more photos of the group of photos.

2. The method of claim 1, wherein the significance values are based on one or more of a frequency that each face appears in the photos and a type of social connection between that target user and each person associated with each face.

3. The method of claim 1,
wherein the selecting of the representative photo to represent the same face in the group of photos comprises:
ranking the selected representative faces based on their frequency as a first ordering; and
ranking the selected representative faces based on their quality ranking as a second ordering.

4. The method of claim 1, wherein the one or more predetermined actions comprise sharing one or more of the photos with people whose faces are shown in the photos.

5. The method of claim 1, wherein the one or more predetermined actions comprise tagging one or more of the photos.

6. A method comprising:
obtaining a plurality of photos associated with a target user in a social network system;
detecting a face of one or more persons in the plurality of photos;
computing significance values for the faces, wherein each significance value indicates a degree of significance between the target user and each person represented by each face;
generating a significance ranking of the significance values; and
determining a group of photos for the target user based on the significance ranking, wherein the determining of the group of photos includes applying a clustering algorithm to consolidate multiple appearances of a same face in the plurality of photos, and wherein the applying of the clustering algorithm includes:
  determining a quality value for each photo that includes the same face, wherein the quality value is based on a combined score of two or more of a face detection confidence score, size, visibility, sharpness, and a facial orientation estimate;
  generating a quality ranking of the quality values; and
  selecting a representative photo to represent the same face in the group of photos based on the quality ranking.

7. The method of claim 6, wherein the significance value for each face is based on one or more of a frequency that each face appears in the plurality of photos and a type of social connection between that target user and each person associated with each face.

8. The method of claim 6, further comprising transmitting the group of photos to the target user.

9. The method of claim 6, further comprising:
transmitting the group of photos to the target user; and
prompting the target user with a sharing option to share one or more of the photos with people whose faces are shown in the photos.

10. The method of claim 6, further comprising:
transmitting the group of photos to the target user; and
prompting the target user with a tagging option to tag one or more of the photos.

11. The method of claim 6, wherein the determining of the group of photos is based at least in part on a predetermined quality criteria.

12. A system comprising:
one or more processors; and
logic encoded in one or more tangible media for execution by the one or more processors and when executed operable to perform operations comprising:
  obtaining a plurality of photos associated with a target user in a social network system;
  detecting a face of one or more persons in the plurality of photos;
  computing significance values for the faces, wherein each significance value indicates a degree of significance between the target user and each person represented by each face;
  generating a significance ranking of the significance values; and
  determining a group of photos for the target user based on the significance ranking, wherein the determining of the group of photos includes applying a clustering algorithm to consolidate multiple appearances of a same face in the plurality of photos, and wherein the applying of the clustering algorithm includes:
    determining a quality value for each photo that includes the same face, wherein the quality value is based on a combined score of two or more of a face detection confidence score, size, visibility, sharpness, and a facial orientation estimate;
    generating a quality ranking of the quality values; and
    selecting a representative photo to represent the same face in the group of photos based on the quality ranking.

13. The system of claim 12, wherein the significance value for each face is based on one or more of a frequency that each face appears in the plurality of photos and a type of social connection between that target user and each person associated with each face.

14. The system of claim 12, wherein the logic when executed is further operable to perform operations comprising transmitting the group of photos to the target user.

15. The system of claim 12, wherein the logic when executed is further operable to perform operations comprising:
transmitting the group of photos to the target user; and
prompting the target user with a sharing option to share one or more of the photos with people whose faces are shown in the photos.

16. The system of claim 12, wherein the logic when executed is further operable to perform operations comprising:

transmitting the group of photos to the target user; and
prompting the target user with a tagging option to tag one
or more of the photos.

\* \* \* \* \*